United States Patent
Garg et al.

(10) Patent No.: US 8,094,630 B2
(45) Date of Patent: Jan. 10, 2012

(54) RADIO FREQUENCY DRAGGING PREVENTION

(75) Inventors: Deepak Garg, Nashua, NH (US); Prasasth R. Palnati, Westford, MA (US); Arthur J. Barabell, Sudbury, MA (US)

(73) Assignee: Airvana Network Solutions, Inc., Chelmsford, MA (US)

( * ) Notice: Subject to any disclaimer, the term of this patent is extended or adjusted under 35 U.S.C. 154(b) by 232 days.

(21) Appl. No.: 11/303,773

(22) Filed: Dec. 16, 2005

(65) Prior Publication Data

US 2007/0140184 A1 Jun. 21, 2007

(51) Int. Cl.
*H04W 4/00* (2009.01)
(52) U.S. Cl. ....................................................... 370/338
(58) Field of Classification Search .................. 455/436, 455/435.1, 466, 452.1, 560, 442, 439, 525, 455/437, 445; 370/338, 331, 203, 349, 216, 370/392, 401
See application file for complete search history.

(56) References Cited

U.S. PATENT DOCUMENTS

| | | | |
|---|---|---|---|
| 5,128,938 A * | 7/1992 | Borras | 370/311 |
| 5,239,675 A | 8/1993 | Dudczak | |
| 5,377,224 A | 12/1994 | Hudson | |
| 5,574,996 A * | 11/1996 | Raith | 455/161.3 |
| 5,754,945 A | 5/1998 | Lin et al. | |
| 5,790,528 A | 8/1998 | Muszynski | |
| 5,815,813 A | 9/1998 | Faruque | |
| 5,828,661 A | 10/1998 | Weaver et al. | |
| 5,852,630 A | 12/1998 | Langberg et al. | |
| 5,857,154 A * | 1/1999 | Laborde et al. | 455/444 |
| 5,884,177 A | 3/1999 | Hanley | |
| 5,930,714 A | 7/1999 | Abu-Amara et al. | |
| 5,937,345 A | 8/1999 | McGowan et al. | |
| 5,940,762 A | 8/1999 | Lee et al. | |
| 5,960,349 A | 9/1999 | Chheda | |
| 5,974,318 A | 10/1999 | Satarasinghe | |
| 5,983,282 A | 11/1999 | Yucebay | |
| 5,991,635 A * | 11/1999 | Dent et al. | 455/517 |
| 6,011,970 A | 1/2000 | McCarthy | |
| 6,014,564 A | 1/2000 | Donis et al. | |
| 6,016,429 A | 1/2000 | Khafizov et al. | |
| 6,023,625 A * | 2/2000 | Myers, Jr. | 455/503 |
| 6,032,033 A | 2/2000 | Morris et al. | |
| 6,047,186 A | 4/2000 | Yu et al. | |
| 6,049,715 A | 4/2000 | Willhoff et al. | |

(Continued)

FOREIGN PATENT DOCUMENTS

AU        1998/72855        12/1998

(Continued)

OTHER PUBLICATIONS

*International Search Report*, Patent Cooperation Treaty, Apr. 26, 2007, 10 pages.

(Continued)

*Primary Examiner* — Melody Mehrpour
(74) *Attorney, Agent, or Firm* — Fish & Richardson P.C.

(57) ABSTRACT

A device receives information about signals detected by an access terminal, a first one of the signals corresponds to a radio node with which the access terminal is in communication, and if a second signal detected by the access terminal does not correspond to signals in use by the radio node and the access terminal, and if a condition is met, the devise causes the access terminal to alter communication with the radio node.

13 Claims, 3 Drawing Sheets

U.S. PATENT DOCUMENTS

| | | | |
|---|---|---|---|
| 6,052,594 A | 4/2000 | Chuang et al. | |
| 6,061,560 A * | 5/2000 | Saboorian et al. | 455/415 |
| 6,069,871 A | 5/2000 | Sharma et al. | |
| 6,091,953 A | 7/2000 | Ho et al. | |
| 6,101,394 A | 8/2000 | Illidge | |
| 6,111,857 A | 8/2000 | Soliman et al. | |
| 6,112,089 A | 8/2000 | Satarasinghe | |
| 6,119,024 A * | 9/2000 | Takayama | 455/574 |
| 6,122,513 A | 9/2000 | Bassirat | |
| 6,151,512 A | 11/2000 | Chheda et al. | |
| 6,167,036 A | 12/2000 | Beven | |
| 6,178,328 B1 | 1/2001 | Tang et al. | |
| 6,192,246 B1 | 2/2001 | Satarasinghe | |
| 6,198,719 B1 | 3/2001 | Faruque et al. | |
| 6,198,910 B1 | 3/2001 | Hanley | |
| 6,208,615 B1 | 3/2001 | Faruque et al. | |
| 6,219,539 B1 | 4/2001 | Basu et al. | |
| 6,223,047 B1 * | 4/2001 | Ericsson | 455/517 |
| 6,233,247 B1 | 5/2001 | Alami et al. | |
| 6,252,862 B1 | 6/2001 | Sauer et al. | |
| 6,256,300 B1 | 7/2001 | Ahmed et al. | |
| 6,266,529 B1 | 7/2001 | Chheda | |
| 6,272,148 B1 | 8/2001 | Takagi et al. | |
| 6,285,875 B1 * | 9/2001 | Alajoki et al. | 455/423 |
| 6,289,220 B1 | 9/2001 | Spear | |
| 6,320,898 B1 | 11/2001 | Newson et al. | |
| 6,345,185 B1 | 2/2002 | Yoon et al. | |
| 6,366,961 B1 | 4/2002 | Subbiah et al. | |
| 6,370,357 B1 | 4/2002 | Xiao et al. | |
| 6,370,381 B1 | 4/2002 | Minnick et al. | |
| 6,393,482 B1 | 5/2002 | Rai et al. | |
| 6,400,712 B1 | 6/2002 | Phillips | |
| 6,404,754 B1 | 6/2002 | Lim | |
| 6,408,182 B1 | 6/2002 | Davidson et al. | |
| 6,418,306 B1 * | 7/2002 | McConnell | 455/413 |
| 6,424,834 B1 | 7/2002 | Chang et al. | |
| 6,430,168 B1 | 8/2002 | Djurkovic et al. | |
| 6,438,376 B1 | 8/2002 | Elliott et al. | |
| 6,438,377 B1 | 8/2002 | Savolainen | |
| 6,445,922 B1 | 9/2002 | Hiller et al. | |
| 6,459,696 B1 | 10/2002 | Carpenter et al. | |
| 6,473,399 B1 | 10/2002 | Johansson et al. | |
| 6,477,159 B1 | 11/2002 | Yahagi | |
| 6,480,476 B1 | 11/2002 | Willars | |
| 6,480,718 B1 | 11/2002 | Tse | |
| 6,507,741 B1 | 1/2003 | Bassirat | |
| 6,522,885 B1 | 2/2003 | Tang et al. | |
| 6,539,030 B1 | 3/2003 | Bender et al. | |
| 6,542,481 B2 | 4/2003 | Foore et al. | |
| 6,542,752 B1 | 4/2003 | Illidge | |
| 6,545,984 B1 | 4/2003 | Simmons | |
| 6,560,453 B1 * | 5/2003 | Henry et al. | 455/67.11 |
| 6,580,699 B1 * | 6/2003 | Manning et al. | 370/331 |
| 6,590,879 B1 | 7/2003 | Huang et al. | |
| 6,611,695 B1 | 8/2003 | Periyalwar | |
| 6,618,585 B1 | 9/2003 | Robinson et al. | |
| 6,621,811 B1 | 9/2003 | Chang et al. | |
| 6,628,637 B1 | 9/2003 | Li et al. | |
| 6,651,105 B1 | 11/2003 | Bhagwat et al. | |
| 6,687,237 B1 | 2/2004 | Lee et al. | |
| 6,701,148 B1 | 3/2004 | Wilson et al. | |
| 6,701,149 B1 | 3/2004 | Sen et al. | |
| 6,711,144 B1 * | 3/2004 | Kim et al. | |
| 6,731,618 B1 * | 5/2004 | Chung et al. | |
| 6,738,625 B1 | 5/2004 | Oom et al. | |
| 6,741,862 B2 * | 5/2004 | Chung et al. | |
| 6,754,191 B1 | 6/2004 | Paranchych et al. | |
| 6,757,319 B1 | 6/2004 | Parsa et al. | |
| 6,768,903 B2 | 7/2004 | Fauconnier et al. | |
| 6,771,962 B2 * | 8/2004 | Saifullah et al. | 455/436 |
| 6,781,999 B2 * | 8/2004 | Eyuboglu et al. | |
| 6,813,498 B1 | 11/2004 | Durga et al. | |
| 6,826,402 B1 | 11/2004 | Tran | |
| 6,834,050 B1 | 12/2004 | Madour et al. | |
| 6,842,630 B2 | 1/2005 | Periyalwar | |
| 6,847,821 B1 | 1/2005 | Lewis et al. | |
| 6,877,104 B1 | 4/2005 | Shimono | |
| 6,909,887 B2 | 6/2005 | Fauconnier et al. | |
| 6,944,452 B2 | 9/2005 | Coskun et al. | |
| 6,975,869 B1 * | 12/2005 | Billon | 455/452.1 |
| 6,996,056 B2 | 2/2006 | Chheda et al. | |
| 6,999,784 B1 | 2/2006 | Choi et al. | |
| 7,035,636 B1 | 4/2006 | Lim et al. | |
| 7,042,858 B1 | 5/2006 | Ma et al. | |
| 7,047,009 B2 | 5/2006 | Laroia et al. | |
| 7,072,663 B2 | 7/2006 | Ramos et al. | |
| 7,079,511 B2 | 7/2006 | Abrol et al. | |
| 7,085,251 B2 | 8/2006 | Rezaiifar | |
| 7,110,785 B1 | 9/2006 | Paranchych et al. | |
| 7,130,626 B2 | 10/2006 | Bender et al. | |
| 7,130,668 B2 * | 10/2006 | Chang et al. | 455/574 |
| 7,139,575 B1 | 11/2006 | Chen et al. | |
| 7,162,247 B2 | 1/2007 | Baba et al. | |
| 7,170,871 B2 | 1/2007 | Eyuboglu et al. | |
| 7,177,650 B1 | 2/2007 | Reiger et al. | |
| 7,200,391 B2 * | 4/2007 | Chung et al. | |
| 7,212,822 B1 | 5/2007 | Vicharelli et al. | |
| 7,236,764 B2 | 6/2007 | Zhang et al. | |
| 7,242,958 B2 * | 7/2007 | Chung et al. | |
| 7,251,491 B2 | 7/2007 | Jha | |
| 7,277,446 B1 * | 10/2007 | Abi-Nassif et al. | |
| 7,298,327 B2 | 11/2007 | Dupray et al. | |
| 7,299,168 B2 | 11/2007 | Rappaport et al. | |
| 7,299,278 B2 * | 11/2007 | Ch'ng | |
| 7,349,699 B1 | 3/2008 | Kelly et al. | |
| 7,398,087 B1 | 7/2008 | McConnell et al. | |
| 7,408,887 B2 * | 8/2008 | Sengupta et al. | 370/252 |
| 7,408,901 B1 * | 8/2008 | Narayanabhatla | 370/331 |
| 7,411,996 B2 | 8/2008 | Kim et al. | |
| 7,453,912 B2 | 11/2008 | Laroia et al. | |
| 7,457,265 B2 | 11/2008 | Julka et al. | |
| 7,486,696 B2 * | 2/2009 | Garg et al. | 370/468 |
| 7,512,110 B2 * | 3/2009 | Sayeedi et al. | 370/349 |
| 7,546,124 B1 | 6/2009 | Tenneti et al. | |
| 7,751,835 B2 | 7/2010 | Sharma et al. | |
| 7,751,858 B2 | 7/2010 | Chou | |
| 2002/0025820 A1 | 2/2002 | Fauconnier et al. | |
| 2002/0031107 A1 | 3/2002 | Li et al. | |
| 2002/0032034 A1 | 3/2002 | Tiedemann et al. | |
| 2002/0035699 A1 | 3/2002 | Crosbie | |
| 2002/0067707 A1 * | 6/2002 | Morales et al. | 370/331 |
| 2002/0068570 A1 | 6/2002 | Abrol et al. | |
| 2002/0082018 A1 | 6/2002 | Coskun | |
| 2002/0085719 A1 | 7/2002 | Crosbie | |
| 2002/0102976 A1 | 8/2002 | Newbury et al. | |
| 2002/0136226 A1 | 9/2002 | Christoffel et al. | |
| 2002/0145990 A1 * | 10/2002 | Sayeedi | 370/335 |
| 2002/0193110 A1 * | 12/2002 | Julka et al. | 455/432 |
| 2002/0196749 A1 | 12/2002 | Eyuboglu et al. | |
| 2003/0003913 A1 * | 1/2003 | Chen et al. | 455/436 |
| 2003/0026240 A1 | 2/2003 | Eyuboglu et al. | |
| 2003/0031201 A1 | 2/2003 | Choi | |
| 2003/0067970 A1 | 4/2003 | Kim et al. | |
| 2003/0095513 A1 | 5/2003 | Woodmansee et al. | |
| 2003/0100311 A1 * | 5/2003 | Chung et al. | |
| 2003/0114162 A1 | 6/2003 | Chheda et al. | |
| 2003/0117948 A1 | 6/2003 | Ton et al. | |
| 2003/0125039 A1 | 7/2003 | Lachtar et al. | |
| 2003/0195016 A1 | 10/2003 | Periyalwar | |
| 2004/0008649 A1 | 1/2004 | Wybenga et al. | |
| 2004/0015607 A1 | 1/2004 | Bender et al. | |
| 2004/0038700 A1 | 2/2004 | Gibbs | |
| 2004/0068668 A1 | 4/2004 | Lor et al. | |
| 2004/0081111 A1 | 4/2004 | Bae et al. | |
| 2004/0179492 A1 | 9/2004 | Zhang et al. | |
| 2004/0203771 A1 | 10/2004 | Chang et al. | |
| 2004/0214574 A1 | 10/2004 | Eyuboglu et al. | |
| 2004/0218556 A1 * | 11/2004 | Son et al. | 370/311 |
| 2004/0224687 A1 * | 11/2004 | Rajkotia | 455/435.1 |
| 2005/0021616 A1 | 1/2005 | Rajahalm et al. | |
| 2005/0025116 A1 * | 2/2005 | Chen et al. | 370/349 |
| 2005/0053034 A1 | 3/2005 | Chiueh | |
| 2005/0011429 A1 | 5/2005 | Kim et al. | |
| 2005/0113117 A1 | 5/2005 | Bolin et al. | |
| 2005/0124343 A1 * | 6/2005 | Kubo | 455/436 |
| 2005/0148297 A1 | 7/2005 | Lu et al. | |
| 2005/0181795 A1 * | 8/2005 | Mark et al. | 455/436 |

| | | | | | |
|---|---|---|---|---|---|
| 2005/0207368 A1 | 9/2005 | Nam | CA | 2295922 | 3/2004 |
| 2005/0213555 A1 | 9/2005 | Eyuboglu et al. | CN | 1265253 | 8/2000 |
| 2005/0233746 A1* | 10/2005 | Laroia et al. ............... 455/436 | CN | 1653844 | 10/2004 |
| 2005/0243749 A1* | 11/2005 | Mehrabanzad et al. | CN | 101015224 A | 8/2007 |
| 2005/0245279 A1* | 11/2005 | Mehrabanzad et al. | EP | 625863 | 11/1994 |
| 2006/0030323 A1* | 2/2006 | Ode et al. ................ 455/436 | EP | 0904369 | 3/1999 |
| 2006/0067422 A1* | 3/2006 | Chung | EP | 983694 | 3/2000 |
| 2006/0067451 A1* | 3/2006 | Pollman et al. | EP | 983705 | 3/2000 |
| 2006/0126509 A1* | 6/2006 | Abi-Nassif | EP | 995278 | 4/2000 |
| 2006/0126554 A1* | 6/2006 | Motegi et al. ................ 370/328 | EP | 995296 | 4/2000 |
| 2006/0126556 A1 | 6/2006 | Jiang et al. | EP | 1005245 | 5/2000 |
| 2006/0148460 A1 | 7/2006 | Mukherjee et al. | EP | 1011283 | 6/2000 |
| 2006/0159045 A1* | 7/2006 | Ananthaiyer et al. | EP | 1014107 | 6/2000 |
| 2006/0182063 A1 | 8/2006 | Jia et al. | EP | 1397929 | 3/2004 |
| 2006/0203766 A1* | 9/2006 | Kim et al. .................... 370/328 | EP | 1491065 | 12/2004 |
| 2006/0209760 A1 | 9/2006 | Saito et al. | EP | 1751998 | 2/2007 |
| 2006/0209882 A1 | 9/2006 | Han et al. | EP | 1896980 | 3/2008 |
| 2006/0240782 A1* | 10/2006 | Pollman et al. | EP | 1897383 | 3/2008 |
| 2006/0259628 A1 | 11/2006 | Vadlapudi et al. | GB | 2447585 | 8/2008 |
| 2006/0291420 A1 | 12/2006 | Ng | GB | 2452688 | 3/2009 |
| 2006/0294214 A1* | 12/2006 | Chou ............................ 709/223 | GB | 2447585 | 10/2010 |
| 2006/0294241 A1 | 12/2006 | Cherian et al. | HK | 1101334 A | 10/2007 |
| 2007/0022396 A1 | 1/2007 | Attar et al. | JP | 2007-538476 | 12/2007 |
| 2007/0026884 A1* | 2/2007 | Rao | JP | 2008-547329 | 12/2008 |
| 2007/0058628 A1* | 3/2007 | Palnati et al. | JP | 2008-547358 | 12/2008 |
| 2007/0077948 A1 | 4/2007 | Sharma et al. | KR | 9833373 | 8/1998 |
| 2007/0097916 A1 | 5/2007 | Eyuboglu et al. | KR | 2004/046069 | 6/2004 |
| 2007/0099632 A1 | 5/2007 | Choksi | KR | 2004/089744 | 10/2004 |
| 2007/0105527 A1 | 5/2007 | Nylander et al. | KR | 787289 | 12/2007 |
| 2007/0115896 A1* | 5/2007 | To et al. | MX | 1999/10613 | 3/2002 |
| 2007/0140172 A1 | 6/2007 | Garg et al. | WO | WO9748191 | 12/1997 |
| 2007/0140184 A1 | 6/2007 | Garg et al. | WO | WO 98/08353 | 2/1998 |
| 2007/0140185 A1 | 6/2007 | Garg et al. | WO | WO 98/09460 | 3/1998 |
| 2007/0140218 A1 | 6/2007 | Nair et al. | WO | WO98/53618 | 11/1998 |
| 2007/0153750 A1 | 7/2007 | Baglin et al. | WO | WO98/53620 | 11/1998 |
| 2007/0155329 A1 | 7/2007 | Mehrabanzad et al. | WO | WO99/03245 | 1/1999 |
| 2007/0160008 A1 | 7/2007 | Burgess | WO | WO99/04511 | 1/1999 |
| 2007/0197220 A1 | 8/2007 | Willey | WO | WO00/60891 | 10/2000 |
| 2007/0220573 A1 | 9/2007 | Chiussi et al. | WO | WO01/45308 | 6/2001 |
| 2007/0230419 A1 | 10/2007 | Raman et al. | WO | WO02/071633 | 9/2002 |
| 2007/0238442 A1 | 10/2007 | Mate et al. | WO | WO02/071652 | 9/2002 |
| 2007/0238476 A1 | 10/2007 | Sharma et al. | WO | WO03/001820 | 1/2003 |
| 2007/0242648 A1 | 10/2007 | Garg et al. | WO | WO03/009576 | 1/2003 |
| 2007/0248042 A1 | 10/2007 | Harikumar et al. | WO | WO03/081938 | 10/2003 |
| 2008/0003988 A1 | 1/2008 | Richardson | WO | WO2004/064434 | 7/2004 |
| 2008/0009328 A1* | 1/2008 | Narasimha .................... 455/574 | WO | WO2005/012520 | 12/2005 |
| 2008/0013488 A1 | 1/2008 | Garg et al. | WO | WO2005/115026 | 12/2005 |
| 2008/0062925 A1 | 3/2008 | Mate et al. | WO | WO2006/081527 | 8/2006 |
| 2008/0065752 A1 | 3/2008 | Ch'ng et al. | WO | WO2007/002659 | 1/2007 |
| 2008/0069020 A1 | 3/2008 | Richardson | WO | WO2007/028122 | 3/2007 |
| 2008/0069028 A1 | 3/2008 | Richardson | WO | WO2007/028252 | 3/2007 |
| 2008/0070574 A1 | 3/2008 | Vikberg et al. | WO | WO2007/044099 | 4/2007 |
| 2008/0076398 A1 | 3/2008 | Mate et al. | WO | WO2007/045101 | 4/2007 |
| 2008/0117842 A1 | 5/2008 | Rao | WO | WO 2007/075446 | 7/2007 |
| 2008/0119172 A1 | 5/2008 | Rao et al. | WO | WO 2007/078766 | 7/2007 |
| 2008/0120417 A1 | 5/2008 | Harikumar et al. | WO | WO2007/078766 | 5/2011 |
| 2008/0139203 A1 | 6/2008 | Ng et al. | | | |
| 2008/0146232 A1 | 6/2008 | Knisely | | | |
| 2008/0151843 A1 | 6/2008 | Valmikam et al. | | | |
| 2008/0159236 A1 | 7/2008 | Ch'ng et al. | | | |
| 2008/0162924 A1 | 7/2008 | Chinitz et al. | | | |
| 2008/0162926 A1 | 7/2008 | Xiong et al. | | | |
| 2008/0253550 A1 | 10/2008 | Ch'ng et al. | | | |
| 2008/0254792 A1 | 10/2008 | Ch'ng | | | |
| 2008/0273493 A1 | 11/2008 | Fong et al. | | | |
| 2008/0287130 A1* | 11/2008 | Laroia et al. ................ 455/436 | | | |
| 2009/0034440 A1 | 2/2009 | Samar et al. | | | |
| 2009/0082020 A1 | 3/2009 | Ch'ng et al. | | | |
| 2009/0088155 A1 | 4/2009 | Kim | | | |
| 2009/0103494 A1 | 4/2009 | Ma et al. | | | |
| 2009/0116445 A1 | 5/2009 | Samar et al. | | | |
| 2009/0129334 A1 | 5/2009 | Ma et al. | | | |
| 2009/0156218 A1 | 6/2009 | Garg et al. | | | |

FOREIGN PATENT DOCUMENTS

| | | |
|---|---|---|
| AU | 1998/84574 | 2/1999 |
| AU | 2001/21976 | 6/2001 |
| AU | 735575 | 7/2001 |
| AU | 2003/202721 | 10/2003 |

OTHER PUBLICATIONS

*International Search Report*, Patent Cooperation Treaty, Oct. 29, 2002, 5 pages.

*International Search Report*, Patent Cooperation Treaty, Oct. 26, 2006, 6 pages.

*Written Opinion of the International Searching Authority*, Patent Cooperation Treaty, Oct. 26, 2006, 8 pages.

Paul Bender, et al., "CDMA/HDR: A Bandwidth-Efficient High-Speed Wireless Data Service for Nomadic Users", IEEE Communications Magazine, Jul. 2000.

Paul Bender & Ramin Rezaiifar, "Draft Baseline Text for the 1xEV-DO Upper Layers (excluding Physical Layer)", 3GPP2, Aug. 17, 2000.

3GPP2, "3GPP2 Access Network Interfaces Interoperability Specification 2, Release A," Jun. 2000.

TIA/EIA/TSB-115, "Wireless IP Architecture Based on IETF Protocols", Jun. 6, 2000.

3GPP2, "Wireless IP Network Standard", 3rd Generation Partnership Project 2 (3GPP2), Version 1.0.0, Jul. 14, 2000.

Goran Janevski, "IP-Based Mobile Wireless Access Network Architecture", Nortel Networks-MWIF Contribution, Draft dated Sep. 7, 2000.
*International Preliminary Report on Patentability* for Application No. PCT/US2005/017385, Dec. 7, 2006, 8 pages.
*International Preliminary Report on Patentability* for Application No. PCT/US2006/024958, Jan. 17, 2008, 7 pages.
*EP Examination Report* for Application No. 06785637.7, Feb. 6, 2008, 2 pages.
U.S. Appl. No. 09/891,103, filed Jun. 25, 2001, including application as filed, and pending claims.
PCT application No. PCT/US2002/020380 filed on Jun. 25, 2002, with Publication No. WO2003/001820, including application as filed.
U.S. Appl. No. 11/640,619, filed Dec. 18, 2006, including application as filed.
PCT application No. PCT/US2005/17385 filed on May 17, 2005, with Publication No. WO2005/115026, including application as filed.
U.S. Appl. No. 11/037,896, filed Jan. 18, 2005, including application as filed, and pending claims.
U.S. Appl. No. 11/167,785, filed Jun. 27, 2005, including application as filed, and pending claims.
PCT application No. PCT/US2006/24958 filed on Jun. 27, 2006, with Publication No. WO2007/002659, including application as filed.
U.S. Appl. No. 11/243,405, filed Oct. 4, 2005, including application as filed, and pending claims.
U.S. Appl. No. 11/303,773, filed Dec. 16, 2005, including application as filed, and pending claims.
U.S. Appl. No. 11/305,286, filed Dec. 16, 2005, including application as filed.
PCT application No. PCT/US2006/47524 filed on Dec. 13, 2006, with Publication No. WO2007/078766, including application as filed.
U.S. Appl. No. 11/303,774, filed Dec. 16, 2005, including application as filed, and pending claims.
PCT application No. PCT/US2006/47963 filed on Dec. 15, 2006, with Publication No. WO2007/075446, including application as filed.
U.S. Appl. No. 11/955,644, filed Dec. 13, 2007, including application as filed.
International Search Report and Written Opinion for PCT international application No. PCT/US2006/25018, mailed Jan. 29, 2008 (11 pages).
International Preliminary Report on Patentability for Application No. PCT/US2006/25018, Mar. 19, 2009 (8 pages).
International Preliminary Report on Patentability for PCT international application No. PCT/US2006/047963, mailed Dec. 11, 2008 (5 pages).
International Search Report and Written Opinion for PCT international application No. PCT/US2006/047963, mailed Sep. 26, 2008 (9 pages).
International Search Report and Written Opinion for PCT international application No. PCT/US2006/047524, mailed May 26, 2009 (13 pages).
U.S. Appl. No. 10/848,597, filed May 18, 2004, now U.S. Patent No. 7,170,871, issued Jan. 30, 2007, including application as filed.
U.S. Appl. No. 11/166,893, filed Jun. 24, 2005, including application as filed, and pending claims.
PCT application No. PCT/US2006/025018 filed on Jun. 26, 2006, with Publication No. WO2007/044099, including application as filed.
U.S. Appl. No. 11/402,744, filed Apr. 12, 2006, including application as filed, and pending claims.
3rd Generation Partnership Project "3GPP2", cdma2000 High Rate Packet Data Interface Specification, C.S0024-A, version 4.0, Oct. 25, 2002.
3rd Generation Partnership Project "3GPP2", cdma2000 High Rate Packet Data Interface Specification, C.S0024-A, version 1.0, Mar. 2004.
3rd Generation Partnership Project "3GPP2", cdma2000 High Rate Packet Data Interface Specification, C.S0024-A, version 2.0, Jul. 2005.
3rd Generation Partnership Project "3GPP2", cdma2000 High Rate Packet Data Interface Specification, C.S0024-B, version 1.0, Apr. 2006.
Rashid Attar et al., "Evolution of cdma2000 Cellular Networks: Multicarrier EV-DO", IEEE Communications Magazine, Mar. 2006. pp. 46-53.
Chinese Office action of Chinese application No. 200580024230.0 mailed Mar. 15, 2009 (13 pages).
EP Examination Report for Application No. 05750705.5, Jan. 9, 2007 (2 pages).
TIA/EIA/IS-2001, Interoperability Specification (IOS) for CDMA2000 Network Access Interfaces, Aug. 2001 (revised version of May 2000).
Office action and response history of U.S. Appl. No. 09/891,103 to May 27, 2009.
Office action and response history of U.S. Appl No. 10/848,597 to May 18, 2004.
Office action and response history of U.S. Appl. No. 11/166,893 to May 27, 2009.
Office action and response history of U.S. Appl No. 11/037,896 to May 27, 2009.
Office action and response history of U.S. Appl. No. 11/167,785 to May 27, 2009.
Office action and response history of U.S. Appl No. 11/243,405 to May 27, 2009.
Office action and response history of U.S. Appl No. 11/305,286 to Jun. 1, 2009.
Office action and response history of U.S. Appl. No. 11/303,774 to May 27, 2009.
Office action and response history of U.S. Appl. No. 11/402,744 to May 27, 2009.
Office action and response history of U.S. Appl. No. 11/955,644 to May 27, 2009.
Office Action and response from European Patent Office for Application No. 06836082.5 mailed Jun. 18, 2009 and sent Jul. 21, 2009 (21 pages).
Chinese Office action response of Chinese application No. 200580024230.0 sent Jul. 22, 2009 (8 pages).
Office action and response history of U.S. Appl. No. 11/166,893 to Aug. 11, 2009.
Office action and response history of U.S. Appl. No. 11/955,644 to Aug. 11, 2009.
Office action and response history of U.S. Appl. No. 11/167,785 to Aug. 11, 2009.
Office action and response history of U.S. Appl. No. 11/243,405 to Aug. 11, 2009.
Office action and response history of U.S. Appl. No. 11/305,286 to Aug. 11, 2008.
Office action and response history of U.S. Appl. No. 11/303,774 to Aug. 13, 2009.
Office action and response history of U.S. Appl. No. 09/891,103 to Aug. 11, 2009.
U.S. Appl. No. 10/104,399, filed Mar. 22, 2002, Ma et al.
U.S. Appl. No. 09/871,581, filed May 2001, Chheda et al.
U.S. Appl. No. 09/797,273, filed Mar. 1, 2001, Periyalwar et al.
U.S. Appl. No. 10/013,562, filed Dec. 11, 2001, Hashem et al.
U.S. Appl. No. 09/461,454, filed Dec. 14, 1999, Robinson.
U.S. Appl. No. 09/283,151, filed Apr. 1, 1999, Lee et al.
U.S. Appl. No. 09/217,064, filed Dec. 21, 1998, Xia et al.
U.S. Appl. No. 09/213,523, filed Dec. 17, 1998, Simmons.
U.S. Appl. No. 09/198,387, filed Nov. 24, 1998, Bevan.
U.S. Appl. No. 09/036,191, filed Mar. 6, 1998, Sharma et al.
U.S. Appl. No. 08/859,197, filed May 20, 1997, Chheda et al.
U.S. Appl. No. 60/019,459, filed Jun. 13, 1996, Graves et al.
U.S. Appl. No. 08/057,970, filed May 7, 1993, Willhoff et al.
Australian (AU) Examination Report for Application No. 2005426813, Jun. 4, 2009 (18 pages).
Office action and response history of U.S. Appl. No. 11/402,744 to Aug. 17, 2009.
Office action and response history of U.S. Appl. No. 11/486,545 to Aug. 26, 2009.

3rd Generation Partnership Project 2 "3GPP2", "cdma2000 High Rate Packet Data Interface Specification", C.S0024, version 2, Oct. 27, 2000 (441 pages).

3rd Generation Partnership Project 2 "3GPP2", "cdma2000 High Rate Packet Data Interface Specification", C.S0024-B, version 2, Mar. 2007 (1627 pages).

Library Search for Nortel and frequency handoff. Search results dated Aug. 28, 2009 (85 pages).

Office action and response history of U.S. Appl. No. 11/037,896 to Sep. 17, 2009.

Office action and response history of U.S. Appl No. 11/303,774 to Sep. 17, 2009.

Office action of U.S. Appl. No. 11/303,774 dated Jun. 12, 2009.

Office action and response history of U.S. Appl. No. 11/167,785 to Sep. 22, 2009.

Office action and response history of U.S. Appl. No. 11/243,405 to Nov. 9, 2009.

Office action and response history of U.S. Appl. No. 11/305,286 to Sep. 30, 2009.

Office action and response history of U.S. Appl. No. 11/640,619 to Nov. 9, 2009.

Office action and response history of U.S. Appl. No. 09/891,103 to Nov. 10, 2009.

Office action and response history of U.S. Appl. No. 11/303,774 to Dec. 11, 2009.

Office action and response history of U.S. Appl. No. 11/243,405 to Jan. 6, 2010.

Office action and response history of U.S. Appl. No. 11/037,896 to Jan. 11, 2010.

Office action and response history of U.S. Appl. No. 11/305,286 to Jan. 11, 2010.

Office action and response history of U.S. Appl. No. 11/167,785 to Jan. 11, 2010.

Office action and response history of U.S. Appl. No. 09/891,103 to Dec. 13, 2009.

GB Examination Report for Application No. 0811839.0, mailed Jan. 22, 2010 (2 pages).

Office action and response history of U.S. Appl. No. 11/486,545 to Dec. 8, 2009.

Office action and response history of U.S. Appl. No. 11/402,744 to Nov. 30, 2009.

Chinese Office action of Chinese application No. 200580024230.0 mailed Nov. 20, 2009 (4 pages).

Office action and response history of U.S. Appl. No. 11/166,893 to Dec. 8, 2009.

Office action and response history of U.S. Appl. No. 09/891,103 to Dec. 8, 2009.

Office action and response history of U.S. Appl. No. 11/037,896 to Dec. 8, 2009.

Office action and response history of U.S. Appl. No. 11/243,405 to Dec. 8, 2009.

Office action and response history of U.S. Appl. No. 11/486,545 to Dec. 8, 2009.

Office action and response history of U.S. Appl. No. 11/955,644 to Dec. 8, 2009.

Response filed Aug. 2, 2010 to Chinese office action for Chinese application No. 200580024230.0 dated May 17, 2010 (41 pages).

USPTO Final Office Action in U.S. Appl. No. 11/303,773, dated Aug. 18, 2010, 12 pages.

Fish & Richardson, P.C., Amendment in Reply to Action dated Mar. 30, 2010 in U.S. Appl. No. 11/402,744, filed Aug. 30, 2010, 12 pages.

Notice of Allowance in U.S. Appl. No. 11/303,774, dated Aug. 31, 2010, 4 pages.

USPTO Office Action in U.S. Appl. No. 11/166,893, dated Sep. 2, 2010, 31 pages.

Fish & Richardson, P.C., Supplemental Amendment in Reply to Action dated Jun. 18, 2010 in U.S. Appl. No. 11/640,619, filed Oct. 18, 2010, 20 pages.

USPTO Final Office Action in U.S. Appl. No. 11/167,785, dated Oct. 15, 2010, 10 pages.

USPTO Supplemental Notice of Allowance in U.S. Appl. No. 09/891,103, dated Oct. 15, 2010, 4 pages.

Fish & Richardson, P.C., Amendment in Reply to Action dated Jun. 24, 2010 in U.S. Appl. No. 11/305,286, filed Oct. 25, 2010, 31 pages.

USPTO Final Office Action in U.S. Appl. No. 11/402,744, dated Nov. 12, 2010, 22 pages.

Supplemental Notice of Allowability in U.S. Appl. No. 11/303,774, dated Nov. 22, 2010, 9 pages.

Notice of Allowability in U.S. Appl. No. 11/486,545, dated Nov. 8, 2010, 6 pages.

Notice of Allowance in U.S. Appl. No. 11/303,774, dated Dec. 21, 2010, 8 pages.

Examiner Interview Summary in U.S. Appl. No. 11/166,893, dated Dec. 17, 2010, 3 pages.

Chinese Office action Chinese application No. 200580024230.0 sent Nov. 20, 2009 with English translation (6 pages).

Chinese Office action response of Chinese application No. 200580024230.0 filed Feb. 5, 2010, along with instructions for response and associate recommendation (12 pages).

European Patent Office communication mailed Jun. 18, 2009 and response to Jun. 18, 2009 communication of European application No. 06836082.5 filed Jul. 21, 2009 (21 pages).

Office action and response history of U.S. Appl. No. 11/402,744 to Mar. 30, 2010.

Office action and response history of U.S. Appl. No. 11/167,785 to Apr. 28, 2010.

Office action and response history of U.S. Appl. No. 11/305,286 to Jun. 24, 2010.

Chinese Office action with English translation of Chinese application No. 200580024230.0 dated May 17, 2010 (6 pages).

Response filed May 21, 2010 to GB Examination Report for Application No. 0811839.0, dated Jan. 22, 2010 (12 pages).

GB Examination Report for Application No. 0811839.0, mailed Jun. 3, 2010 (3 pages).

Office action and response history of U.S. Appl. No. 11/037,896 to Jun. 16, 2010.

Office action and response history of U.S. Appl. No. 11/486,545 to May 28, 2010.

Office action and response history of U.S. Appl. No. 11/243,405 to Jun. 17, 2010.

Office action and response history of U.S. Appl. No. 11/640,619 to Jun. 18, 2010.

Office action and response history of U.S. Appl. No. 11/166,893 to Apr. 13, 2010.

Office action and response history of U.S. Appl. No. 09/891,103 to Jun. 14, 2010.

Office action and response history of U.S. Appl. No. 11/303,774 to Jun. 30, 2010.

Office action and response history of U.S. Appl. No. 11/955,644 to Jun. 3, 2010.

Fish & Richardson, P.C., Amendment in reply to Action dated Jun. 16, 2010 in U.S. Appl. No. 11/037,896, dated Jun. 28, 2010, 21 pages.

USPTO Advisory Action in U.S. Appl. No. 11/303,774, dated Jun. 30, 2010, 2 pages.

Examiner Interview Summary in U.S. Appl. No. 11/166,893, dated Jun. 30, 2010, 4 pages.

USPTO Notice of Allowance in U.S. Appl. No. 11/486,545, dated Jul. 28, 2010, 8 pages.

Fish & Richardson, P.C., Amendment in Reply to Action dated Mar. 25, 2010 in U.S. Appl. No. 11/166,893, filed Jun. 28, 2010, 19 pages.

USPTO Final Office Action in U.S. Appl. No. 11/305,286, dated Jun. 24, 2010, 39 pages.

Response filed Aug. 9, 2010 to GB Examination Report for Application No. 0811839.0, dated Jun. 3, 2010 (10 pages).

Final Office Action in U.S. Appl. No. 11/640,619, dated Jan. 7, 2011, 24 pages.

Notice of Allowance in U.S. Appl. No. 11/037,896, dated Jan. 5, 2011, 5 pages.

Fish & Richardson, P.C., Amendment in Reply to Final Office Action dated Nov. 12, 2010 in U.S. Appl. No. 11/402,744, filed on Feb. 14, 2011, 12 pages.

Japanese Office action of application No. 2007-527408 issued Nov. 24, 2010, mailed Nov. 29, 2010 with English translation (21 pages).

Fish & Richardson, P.C., Amendment in Reply to Office Action dated Sep. 2, 2010 in U.S. Appl. No. 11/166,893, filed on Jan. 3, 2011, 18 pages.

USPTO Notice of Allowance in U.S. Appl. No. 11/166,893, dated Mar. 18, 2011, 21 pages.

Notice of Allowability in U.S. Appl. No. 11/486,545, dated Mar. 11, 2011, 9 pages.

USPTO Supplemental Notice of Allowance in U.S. Appl. No. 09/891,103, dated Mar. 14, 2011, 6 pages.

USPTO Non-Final Office Action in U.S. Appl. No. 11/402,744, dated Apr. 1, 2011, 14 pages.

Notice of Allowance in U.S. Appl. No. 11/303,774, dated Apr. 4, 2011, 7 pages.

USPTO Supplemental Notice of Allowance in U.S. Appl. No. 11/166,893, dated Apr. 22, 2011, 17 pages.

International Preliminary Report on Patentability for PCT international application No. PCT/US2006/047524, mailed Apr. 28, 2011 (8 pages).

Notice of Allowance in U.S. Appl. No. 11/037,896, dated May 17, 2011, 8 pages.

Response filed May 30, 2011 to Japanese Office action issued in application No. 2007-527408, Nov. 24, 2010, mailed Nov. 29, 2010 (31 pages).

Fish & Richardson, P.C., Amendment in Reply to Office Action dated Apr. 1, 2011 in U.S. Appl. No. 11/402,744, filed on Jun. 30, 2011, 13 pages.

* cited by examiner

| Sector | Carriers available | Channel List |
|---|---|---|
| 1A | A, B | A, B |
| 1B |  | B |
| 2A | A, B | A, B |
| 2B |  | A, B |
| 4B | B | B |

Table 302

| Sector | Neighbors | Neighbor List |
|---|---|---|
| 1A | 2A | 2A, 4B |
| 1B | 2B, 4B | 2B, 4B |
| 2A | 1A | 1A |
| 2B | 1B | 1B |
| 4B | 1B | 1B |

Table 304

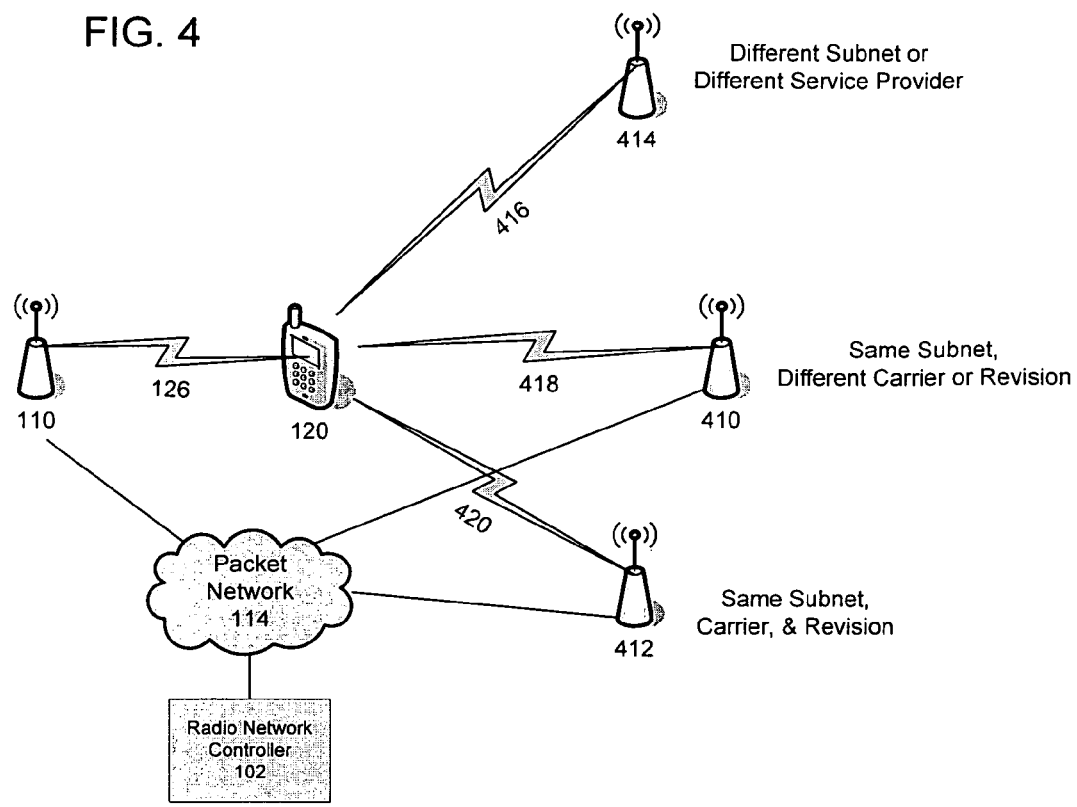

RADIO FREQUENCY DRAGGING PREVENTION

CROSS-REFERENCE TO RELATED APPLICATIONS

This application is related to U.S. application Ser. No. 11/037,896 filed on Jan. 18, 2005, Ser. No. 09/891,103, filed on Jun. 25, 2001, Ser. No. 10/848,597, filed on May 18, 2004, and Ser. No. 11/243,405, filed on Oct. 4, 2005, all of which are incorporated herein by reference.

This application is also related to U.S. application Ser. No. 11/305,286, filed on Dec. 16, 2005, and U.S. application Ser. No. 11/303,774, filed on Dec. 16, 2005, which are also incorporated herein by reference.

TECHNICAL FIELD

This invention relates to radio frequency dragging prevention.

BACKGROUND

High Data Rate (HDR) is an emerging mobile wireless access technology that enables personal broadband Internet services to be accessed anywhere, anytime (see P. Bender, et al., "CDMA/HDR: A Bandwidth-Efficient High-Speed Wireless Data Service for Nomadic Users", IEEE Communications Magazine, July 2000, and 3GPP2, "Draft Baseline Text for 1xEV-DO," Aug. 21, 2000). Developed by Qualcomm, HDR is an air interface optimized for Internet Protocol (IP) packet data services that can deliver a shared forward link transmission rate of up to 2.46 Mbit/s per sector using only (1x) 1.25 MHz of spectrum. Compatible with CDMA2000 radio access (TIA/EIA/IS-2001, "Interoperability Specification (IOS) for CDMA2000 Network Access Interfaces," May 2000) and wireless IP network interfaces (TIA/EIA/TSB-115, "Wireless IP Architecture Based on IETF Protocols," Jun. 6, 2000, and TIA/EIA/IS-835, "Wireless IP Network Standard," 3rd Generation Partnership Project 2 (3GPP2), Version 1.0, Jul. 14, 2000), HDR networks can be built entirely on IP technologies, all the way from the mobile Access Terminal (AT) to the global Internet, thus taking full advantage of the scalability, redundancy and low-cost of IP networks.

An EVolution of the current 1xRTT standard for high-speed data-only (DO) services, also known as the 1xEV-DO protocol has been standardized by the Telecommunication Industry Association (TIA) as TLA/EIA/IS-856, "CDMA2000 High Rate Packet Data Air Interface Specification", 3GPP2 C.S0024-0, Version 4.0, Oct. 25, 2002, which is incorporated herein by reference. Revision A to this specification has been standardized as TIA/EIA/IS-856, "CDMA2000 High Rate Packet Data Air Interface Specification", 3GPP2 C.S0024-A, Version 2.0, June 2005. Revision A is also incorporated herein by reference.

FIG. 1A shows a 1xEV-DO radio access network 100 with radio network controllers 102 and 104 connected to radio nodes 108, 110, and 112 over a packet network 114. The packet network 114 can be implemented as an IP-based network that supports many-to-many connectivity between the radio nodes and the radio network controllers. The packet network is connected to the Internet 116 via a packet data serving node 106. Other radio nodes, radio network controllers, and packet networks (not shown in FIG. 1) can be included in the radio access network. The packet network 114 may be several distinct networks connecting individual radio network controllers to their associated radio nodes, or it may be a single network as shown in FIG. 1, or a combination.

Typically, each radio network controller controls 25-100 radio nodes and each radio node supports 1-4 carriers each of 1.25 MHz of bandwidth. A carrier is a band of radio frequencies used to establish airlinks with access terminals. The geographic area of the radio access network that is served by any given radio node is referred to as a cell. Each cell can be divided into multiple sectors (typically 3 or 6) by using multiple sectorized antennas (the term "sector" is used both conventionally and in this document, however, even when there is only one sector per cell).

Access terminals, e.g., devices 118, 120, and 122, communicate with the radio nodes of the network 100 over airlinks, e.g., links 124, 126, and 128. Each access terminal may be a laptop computer, a Personal Digital Assistant (PDA), a dual-mode voice/data handset, or another device, with built-in 1xEV-DO Rev-0 or Rev-A support. As 1xEvDO Rev-A is backwards compatible with 1xEvDO Rev-0, Rev-A capable access terminals can operate in either Rev-0 mode or Rev-A mode, depending on whether its serving radio node is Rev-0 or Rev-A capable. A Rev-0 device in communication with a Rev-A radio node will only be able to use Rev-0 services.

When an active access terminal moves from one sector to another, it asks for airlinks on new sectors via Route Update messages. In certain cases, the access terminal may not be able to obtain an airlink on a sector—as a result, the access terminal may remain in communication with the radio node of the sector it is leaving longer (instead of transitioning to the radio node of the sector it is entering). For example, in FIG. 1B, an access terminal 120 has moved from sector 1, where it was in communication with a radio node 110, into sector 2, served by radio node 112. The access terminal 120 is still in communication with the radio node 110 over an airlink 126, instead of establishing a new airlink 130 with the radio node 112. Each radio node transmits a pilot signal to identify itself and inform access terminals of the carriers the radio node uses and which revisions it supports. The access terminal 120 monitors pilot signals in its environment to determine which radio nodes it should establish communication with. An access terminal may be limited in its ability to receive or interpret pilot signals that are transmitted on different carriers or using different revisions than the access terminal is currently using. Likewise it may fail to recognize a pilot signal from a radio node on a different subnet than the radio node with which it is presently communicating. If the access terminal 100 does not recognize that it could use any of the signals it is detecting, or if it fails to detect signals it could use, it may remain in communication with the radio node 110 long after it could have established a better connection to the radio node 112. This condition is referred to as RF Dragging. RF Dragging can cause a degradation in the quality of service the user experiences, for example, a reduced rate of data transmission or an increased number of errors in transmission; in some cases, the connection may be dropped. In such a case, it may be desirable to disconnect the access terminal 120 from the radio node 110 serving the sector it is leaving to force it to transition to the radio node 112 serving the sector it is entering.

SUMMARY

In general, in one aspect, a device receives information about signals detected by an access terminal, a first one of the signals corresponds to a radio node with which the access terminal is in communication, and if a second signal detected by the access terminal does not correspond to signals in use by the radio node and the access terminal, and if a condition is met, the devise causes the access terminal to alter communication with the radio node.

Implementations may include one or more of the following features. The altering includes closing communication with the radio node. The altering also includes opening communication with a radio node that is generating the second signal. The first and second signals originate from different radio access networks. The different radio access networks comprise radio access sub-networks. The different radio access networks are operated by different radio network operators. The first and second signals use different carriers. The first and second signals operate in different modes. The different modes comprise revision levels. Evaluating the condition comprises comparing a quality of the second signal to a threshold. The threshold is based on a quality of the first signal. The condition is met if the quality of the second signal is greater than the threshold. The information is received repeatedly, and the condition is met if the quality of the second signal is greater than the threshold during a number of sequential times that the information is received. The quality of the second signal is the power of the second signal. The quality of the first signal is the power of the first signal. The information is received from the access terminal. Sending a message instructing the access terminal to send the information. Sending the message repeatedly. A rate at which the message is repeated depends on a quality of the second signal. The quality is a power of the second signal. Increasing the rate if the power of the second signal is greater than a threshold. The threshold is based on a power of the first signal. A value to which the rate is increased is based on a number of times the condition must be met. The radio node and the access terminal are in a radio access network comprising sectors, and a rate at which the message is repeated depends on a location of the access terminal. A rate at which the message is repeated is increased if the access terminal is in a sector that uses a carrier that is not used by a neighboring sector. A value to which the rate is increased is based on a number of times the condition must be met.

Implementations may also include one or more of the following features. The radio node and the access terminal are in a radio access network comprising sectors. Transmitting information for each sector, in which selection of the information is based on criteria that are not the same in each sector. The criteria for the selection of information for a sector comprise resources available in the sector, in co-located sectors, and in neighboring sectors. The information for each sector includes an identification of a carrier used in that sector, and if two sectors are co-located in a first area, the information for each sector includes an identification of a carrier used by the other sector unless there is a neighboring second area in which no sector uses the carrier used by the other sector. If there is a first sector in a first area using a first carrier, and the access terminal is in the first sector using the first carrier, and there is a neighboring second area in which no sector uses the first carrier, then causing the access terminal to alter communication comprises instructing the access terminal to disconnect from the radio node and to connect to a second radio node using the information transmitted for a second sector. The information for each sector includes an identification of any sector in a neighboring area that uses the same carrier as that sector, and if a first sector in a first area uses a first carrier, and a second sector in a neighboring second area uses a second carrier, and there is no sector in the second area using the first carrier, then the information for the first sector includes an identification of the second sector. If there is a first sector in a first area using a first carrier, and the access terminal is in the first sector, and there is a neighboring second area in which no sector uses the first carrier, causing the access terminal to alter communication comprises instructing the access terminal to disconnect from the radio node and to connect to a second radio node using the information transmitted for the first sector. Causing the access terminal to alter communication comprises instructing the access terminal to transition between sectors. The information for each sector includes a first list and a second list. The first list for each sector includes an identification of a carrier used in that sector. The second list for each sector includes an identification of any sector in a neighboring area that uses the same carrier as that sector. If two sectors are co-located in a first area, then the first list for each sector includes an identification of a carrier used by the other sector unless there is a neighboring second area in which no sector uses the carrier used by the other sector. If a first sector in a first area uses a first carrier, and a second sector in a neighboring second area uses a second carrier, and there is no sector in the second area using the first carrier, then the second list for the first sector includes an identification of the second sector.

In general, in one aspect, a device receives information about at least two signals detected by an access terminal, places the signals into at least two groups, in which a first group comprises signals corresponding to a radio node with which the access terminal is in communication, and a second group comprises signals not corresponding to signals is use by the radio node and the access terminal, and if a signal in the second group meets a condition, causes the access terminal to alter communication with the radio node.

Among the advantages of the invention are one or more of the following. A radio network controller is able to determine that an access terminal is in a border area. The radio network controller can cause the access terminal to change its communications parameters so that it will minimize or prevent RF dragging. A user may experience a higher quality of service including fewer transmission errors, a higher data rate, and fewer lost connections.

Other general aspects include other combinations of the aspects and features described above and other aspects and features expressed as methods, apparatus, systems, program products, and in other ways.

The details of one or more embodiments of the invention are set forth in the accompanying drawings and the description below. Other features, objects, and advantages of the invention will be apparent from the description and drawings, and from the claims.

DESCRIPTION OF DRAWINGS

FIGS. 1A, 1B, and 4 are diagrams of parts of radio access networks.

Like reference symbols in the various drawings indicate like elements.

DETAILED DESCRIPTION

Figure 1A:
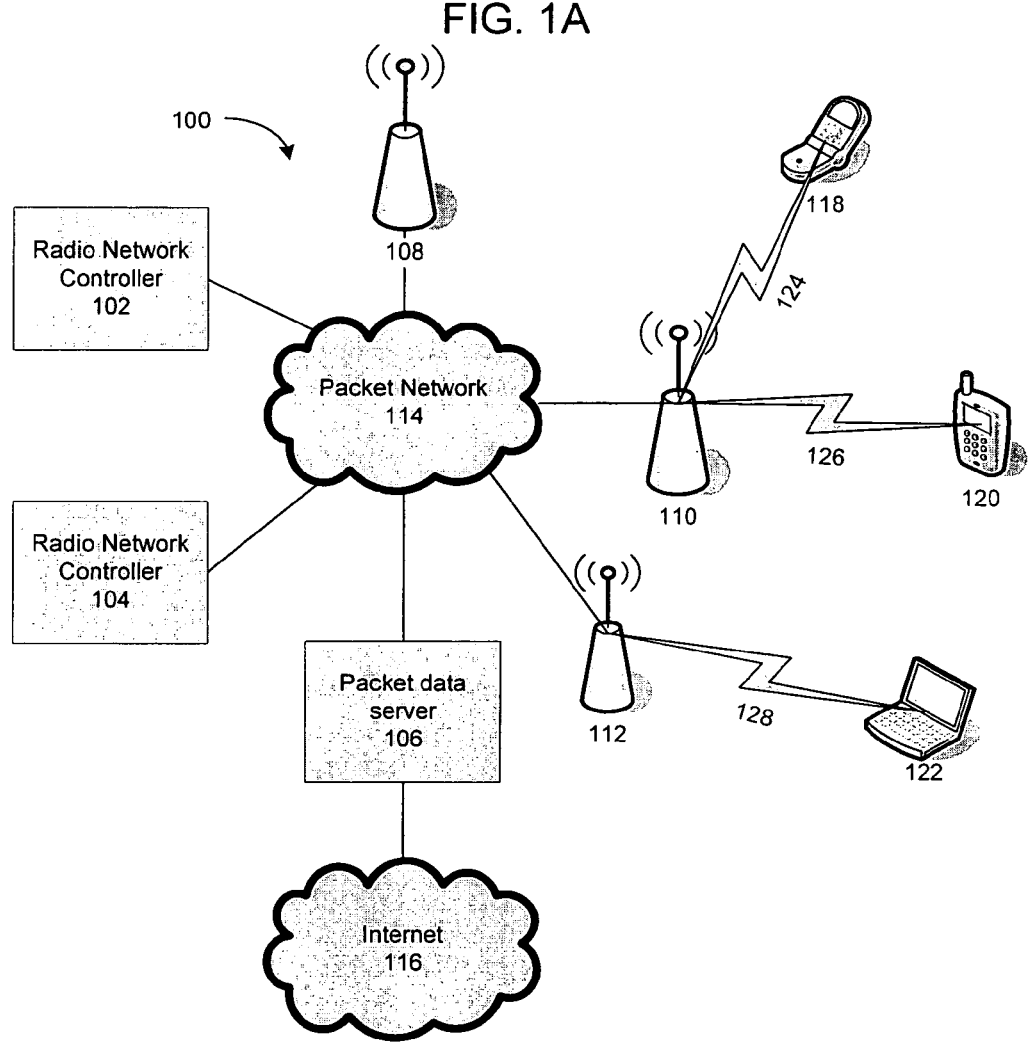
Figure 1B:
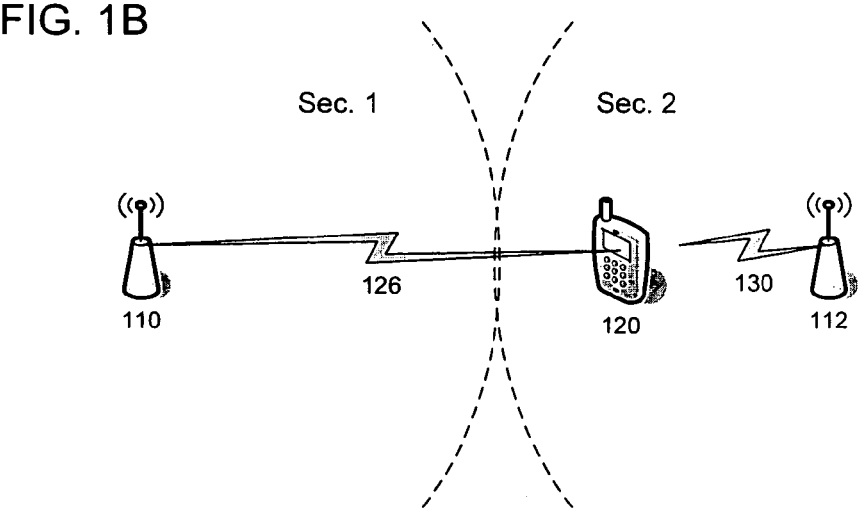

In one example, the 1xEvDO radio access network 100 of FIG. 1A is implemented as a multi-revision, multi-carrier network having two subnets. Each subnet has a radio network controller and a number of radio nodes. The radio nodes of a subnet can be Rev-0-capable radio nodes, Rev-A-capable radio nodes, or a combination of both. Each radio node transmits signals to each sector of its cell using one or more carriers.

Suppose an access terminal 120 has a connection 126 with the radio network controller 102 through its serving radio node 110. As the access terminal 120 moves away from a coverage area of the serving radio node 110 and towards the coverage areas of other radio nodes 108 or 112, the access terminal detects the pilot signals transmitted by these radio nodes and reports its findings back to the radio network controller 102 in a Route Update message. The radio network controller 102 uses the information provided in the Route Update message to identify border situations in which it would be preferable to close the connection 126 to the access terminal 120 and trigger a connection re-establishment on a different carrier and/or mode of operation, such as revision level. In so doing, the radio network controller prevents or otherwise minimizes RF dragging.

The radio network controller can use a signal categorization approach, a route update approach, and/or a pilot beacon approach to identify border situations. Each approach is discussed below.

Signal Categorization Approach

In the signal categorization approach, the radio network controller 120 categorizes the pilot signals reported in the Route Update message according to several criteria, as illustrated in FIG. 4. The radio network controller attempts to identify each pilot signal reported in the Route Update message by looking at a list of neighboring sectors iteratively for each pilot signal. Pilot signals can be resolved into two categories, known or unknown. known signals can be further categorized as eligible or ineligible. Known signals (e.g., 418 and 420) are those that originate from a radio node (e.g., 410 and 412) in the same subnet as the radio node currently serving access terminal 120. The radio network controller can identify these signals based on their presence in a database of such signals. Unknown signals, those not in the database, (e.g., signal 416) may originate from a radio node on a different subnet or a radio access network operated by a different service provider, e.g., radio node 414. Eligible signals are known signals that are also on the same carrier and using the same revision as the existing communications link between access terminal 120 and radio node 110, e.g., signal 420 transmitted by radio node 412. Ineligible signals are those that are on a different carrier, revision, or both, e.g. signal 418 transmitted by radio node 410. Although an access terminal may communicate with a radio node using a different revision, some services may not be available, though a lowest common denominator of services can be supported. For this reason, a pilot signal using a different revision is treated similarly to one using a different carrier.

To avoid the degraded service that can result from RF dragging, the radio network controller 102 may command the access terminal 120 to disconnect from the radio node 110. This condition can be triggered when certain criteria are met. In one example, the signal strength of the pilot signals ranges between 0 and 63, in units of −0.5 dB, such that 0 is the strongest and 63 is the weakest possible signal strength. The connection is closed if the strength of the strongest unknown pilot signal exceeds the strength of the strongest known pilot signal by a value of 4 (2 dB) repeatedly over a configurable number of consecutive Route Update messages generated by the access terminal. The value set for the threshold could be higher or lower depending on the preferences of the network operator. The number of consecutive times that the condition must be met can also be configured according to the operator's preferences. When the conditions are met and the disconnect command is sent, the access terminal 120 will switch carriers, revisions, subnets, or service providers, as appropriate, so that it can establish a new link using the best available signal. Alternatively, it may be instructed in which parameter to change by the radio network controller 102 before it is disconnected. Not all access terminals can use all carriers or revisions, so the best available signal is not necessarily the strongest. Which signal is best may be influenced by such factors as services available with a particular revision, interference present on a particular carrier, load on each subnet, and the current service provider's relationship with the service provider of an unknown signal. Decisions about whether to disconnect and what services to use to reconnect may also be influenced by the geographical relationships between radio nodes, as explained below.

If an access terminal is moving towards another sector, but the unknown pilot signal from that sector was not yet sufficiently strong to trigger the conditions discussed above, the access terminal under normal conditions might not send another Route Update message until after entering the new sector. To prevent this, the radio network controller may request Route Update messages more frequently than the access terminal would normally send them. For example, if the strength of the unknown pilot signal is above 28, in the units of the previous example, but below or within 4 units above the strongest known pilot signal, the radio network controller may begin requesting Route Update messages every 60 ms. This will continue until either the strength of the unknown pilot signal exceeds that of the strongest known pilot signal by 4 units for the set number of times, or until it drops below 28 units. Other values could, of course, be used for the threshold strength values and the time between requests, based upon the preferences of the network operator.

Requests for Route Update messages may be paced by inserting quiet periods between two bursts (a burst consists of several requests), for example a burst of four requests separated by 20 ms repeated every 60 ms. By inserting quiet periods (of varying time periods), peculiar situations wherein the access terminal is stationary can be handled without excessive burden of generating Route Updates & processing Route Updates. In one example, the number of requests in a burst is greater than or equal to the number of sequential route update messages that would be required to report a sufficiently strong unknown pilot signal to trigger a disconnect. This will assure that the radio network controller is informed as soon as the access terminal moves sufficiently far into the range of the unknown pilot signal that it should be transitioned to that signal.

Border Detection

Figure 2:
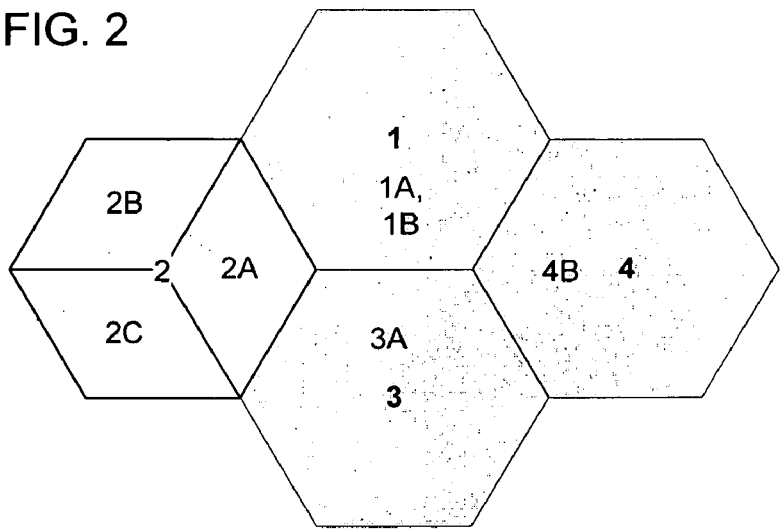
FIG. 2 is a diagram of several sectors in a radio access network.

As illustrated in FIG. 2, the geographic regions serviced by radio nodes are referred to as cells, and the geographic relationship between cells may be considered in controlling a radio area network. Within a cell, there may be multiple sectors, based on the carriers used by the radio nodes, e.g. sectors 2A, 2B, and 2C in cell 2. Sectors may overlap, if two different carriers are used over the same area of a cell, for example, sectors 1A and 1B in cell 1. These are referred to as co-located sectors For the purposes of these examples, sectors in different cells using the same carrier will be labeled with the same letter in each cell. Carrier A is in use throughout cells 1 and 3 (sectors 1A and 3A), and in sector 2A of cell 2. Carrier B is in use throughout cells 1 and 4 (sectors 1B and 4B), and in sector 2B of cell 2. Border sectors are those that use a carrier that is not used in a neighboring sector. For example, sectors 1A and 3A are border sectors because carrier A is not used in an adjacent cell, cell 4. Likewise, sectors 1B and 4B are border sectors because carrier B is not used in cell 3 or in the area of cell 2 which is adjacent to sector 1B, i.e., the area covered by sector 2A. If an access terminal is in a border sector, e.g., sector 3A, communicating with the sector's radio node on its respective carrier, e.g., carrier A, and it moves into a neighboring sector that doesn't use that carrier, e.g., sector 4B, the access terminal may remain in communication with its old radio node rather than switching to the alternative radio node which is now closer. The identification of border cells can be useful in preventing this RF Dragging in several different ways.

Pilot Beacon Approach

Figure 3:
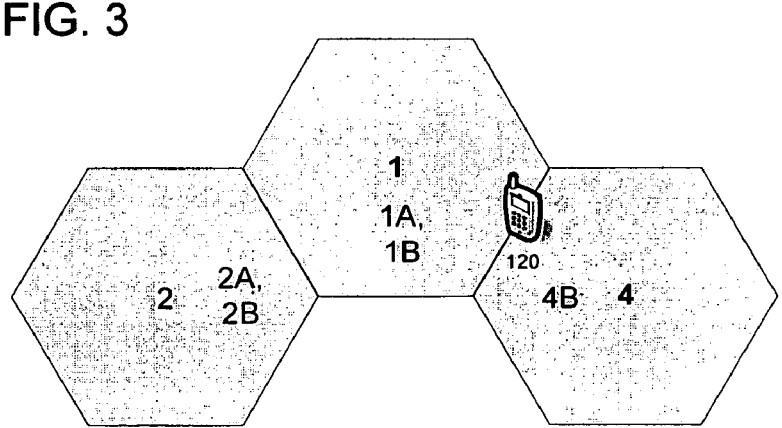
FIG. 3 is a diagrams of several sectors and an access terminal in a radio access network.

One example, as illustrated in FIG. 3, is the pilot beacon approach to preventing RF Dragging. "Pilot beacon" is another term for the pilot signals discussed above. Under this approach, the pilot signal transmitted for each sector includes a channel list which lists the carriers available in that sector and in any co-located sectors. In FIG. 3, the channel list for each of sectors 1A, 1B, 2A, and 2B will ordinarily include carriers A and B, because both carriers are available in the area covered by each sector. Likewise, the channel list for sector 4 will only include carrier B because there is no co-located sector using carrier A. When an access terminal, e.g., access terminal 120, moves into a new sector, it consults the channel list for that sector to determine which carriers it can use to communicate with the radio node in that sector. This has advantages over relying upon the access terminal to detect the carriers in use, since if it is in active communication with the radio node from the sector it is leaving, it may only detect pilot signals on the carrier that it is currently using. Since the channel list is transmitted on each carrier, the active access terminal will still discover that it could be using a different carrier. The problem of RF Dragging is still present, however, when an active access terminal moves from a border sector to a sector that doesn't support the carrier the access terminal is presently using. For example, if the access terminal 120 is in sector 1A, and therefore using carrier A, and it moves to cell 4, where there is no sector using carrier A, it may remain connected to the radio node supporting sector 1A instead of switching to the radio node supporting sector 4B. The access terminal 120 will be expecting a channel list on its present carrier, A, but since sector 4B only uses carrier B, that is the only carrier on which it is transmitting any channel list. If the access terminal 120 had been in sector 1B, and therefore using carrier B, it would have made the transition to sector 4B without difficulty.

This problem is addressed in this example by modifying the channel list of the sector co-located with the border sector, that is, sector 1B. As shown in Table 302 of FIG. 3, sector 1B will only list carrier B in its channel list, even though carrier A is also available in that sector. As the access terminal 120 moves through cell 1 toward cell 4, using carrier A in sector 1A, the quality of signals from sector 4B will increase and the quality of signals from sectors 1A and 1B will decrease. When signals from sector 4B reach a certain threshold quality for a certain amount of time, indicating that the access terminal 120 might move to that sector, the radio network controller for these sectors (not shown) instructs the access terminal 120 to change carriers. The quality of the signal used to make this determination may be its power, data rate, or some other factor. Since the channel list from sector 1A told the access terminal 120 that carrier B was available, it will switch to that carrier and join sector 1B. Once in 1B, however, the channel list only lists carrier B, so the access terminal 120 will remain on carrier B rather than switching back to carrier A, which it might have otherwise done for a variety of reasons, such as to avoid interference with other devices using carrier B, or because sector 1A had fewer users than sector 1B. When it moves in to sector 4B, the access terminal 120 will be on the right carrier to get the channel list for the new sector and properly transition to the radio node for that sector. As in other examples, the momentary disruption from switching carriers may be less significant to a user of the access terminal 120 than the degradation of service that the user would experience if the access terminal experienced RF dragging as it moved into sector 4B. If the conditions triggering the switch require that the new sector's signal must reach the threshold quality for a certain amount of time, or for a certain number of periodic samples, a hysteresis will occur, such that once switched, the access terminal 120 will remain on its new carrier for at least that same amount of time, rather than continually switching back and forth while it is in an area where switch-over criteria are met.

Route Update Approach

A second example, also illustrated in FIG. 3, is the route update approach to preventing RF Dragging. Under this approach, the channel list is not modified as in the pilot beacon approach, but a second list, a neighbor list, transmitted separately from the pilot beacon, is modified to allow the access terminal to report appropriate pilot signals. Normally, the neighbor list for a given sector lists the neighboring sectors that use the same carrier. For example as shown in Table 304, the neighbor list for sector 1B includes 2B and 4B, since both of those sectors neighbor sector 1B and use the same carrier. Using the neighbor list, an active access terminal moving through a sector looks for new sectors only on the carrier it is already using. In the example of FIG. 3, if an access terminal 120 is using carrier B, as it moves through sector 1B, it references sector 1B's neighbor list and therefore monitors pilot signals from sectors 2B and 4B so that it can switch to them when it moves into the corresponding sectors.

In a border sector, e.g., sector 1A, the neighbor list is modified to include neighboring sectors that use different carriers. Since carrier A is not used in the area of sector 4B, sector 1A is a border sector, and its neighbor list will include 2A and 4B. This way, if an access terminal 120 is active on carrier A as it moves through sector 1A, it will monitor pilot signals on both carriers A and B, looking for sectors 2A or 4B. As it draws near to sector 4B, the pilot signal on carrier B will be better than either the current signal or the pilot signal from sector 2A. Observing this, the radio network controller (not shown) for these sectors will instruct the access terminal 120 to close its connection. When the access terminal re-opens its connection, it will do so on channel B since that is the better signal, and it will be able to move smoothly between sectors 1B (if its still in cell 1) and 4B. If the neighbor list for sector 1A had not included 4B, the access terminal would only have been monitoring pilot signals on carrier A and would not have found sector 4B. As in other examples, the momentary disconnection required to switch carriers is less disruptive than remaining on carrier A as its signal faded. The radio network controller will require that the criteria for switching are met for a minimum amount of time or number of cycles, so that an access terminal remaining in a transition area will not continually switch back and forth between carriers.

The same approaches can be used with parameters other than carriers, for example channel lists or neighbor lists could list which revisions or subnets are available, so that that information can be used in determining when to disconnect & reestablish a connection and what parameters to change when doing so.

In the examples of FIGS. 3 and 4, the radio network controller 102 (FIG. 4) may poll the access terminal 120 periodically to determine which pilot signals it is receiving. To improve the decision-making process, the radio network controller may poll the access terminal more often when it is in a border cell or is detecting unknown or ineligible signals, so that the decision to switch carriers or other parameters may be made at the optimum time. This increase in polling frequency also helps the radio network controller to maintain a hysteresis, that is, making sure that an access terminal doesn't continually switch back and forth while it is in an area where criteria might otherwise be met to switch back to its previous settings as soon as it switched as instructed.

Any of the examples above may be combined to provide even more robust prevention of RF Dragging. For example, categorization of signals into known or unknown and eligible or ineligible may be combined with channel lists as in the pilot beacon approach so that both the fact that an access terminal is in a border sector and the usefulness of the various signals from the neighboring cells can be used to determine when to switch carriers, revisions, or other parameters. Similarly, both channel lists and neighbor lists in border sectors may be modified so that access terminals in border sectors are informed as to both what channels are available and which neighboring sectors use those channels.

Although the techniques described above employ the 1xEV-DO air interface standard, the techniques are also applicable to other CDMA and non-CDMA air interface technologies.

The techniques described above can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

A number of embodiments of the invention have been described. Nevertheless, it will be understood that various modifications may be made without departing from the spirit and scope of the invention. For example, pilot signals from different subnets might be categorized as known, rather than unknown, if those subnets have a particular relationship. Accordingly, other embodiments are within the scope of the following claims.

What is claimed is:

1. A method performed by at least one of a radio network controller or a radio node, comprising:
receiving information about signals detected by an access terminal, a first signal of the signals being generated by the radio node with which the access terminal is in communication, the radio node, the radio network controller, and the access terminal being in a radio access network, the radio access network comprising sectors, the radio network controller being in communication with the radio node, the radio network controller and the access terminal being different entities and the radio node and the access terminal being different entities;
if a second signal of the signals detected by the access terminal does not correspond to a signal between the radio node and the access terminal, and if a condition is met, instructing the radio node to instruct the access terminal to alter communication with the radio node;
evaluating the condition by comparing a quality of the second signal to a threshold;
transmitting second information for each of the sectors, wherein selection of the second information is based on criteria that are not same in each of the sectors; and
repeatedly transmitting a message to the access terminal, wherein the message instructs the access terminal to send the information about signals,
wherein the condition comprises that the second signal detected by the access terminal has a quality greater than a threshold, and
wherein instructing the radio node to instruct the access terminal to alter communication comprises instructing the radio node to instruct the access terminal to transition between sectors.

2. A method, comprising:
receiving information about signals detected by an access terminal, a first signal of the signals being generated by a radio node with which the access terminal is in communication, the radio node and the access terminal being in a radio access network, the radio access network comprising sectors;
if a second signal of the signals detected by the access terminal does not correspond to a signal between the radio node and the access terminal, and if a condition is met, causing the access terminal to alter communication with the radio node;

transmitting second information for each sector, in which selection of the second information is based on criteria that are not same in each sector, wherein the second information for each sector comprises an identification of a carrier used in that sector, and wherein if two sectors are co-located in a first area, second information for one of the two sectors comprises an identification of a carrier used by another of the two sectors unless there is a neighboring second area in which no sector uses the carrier used by the other of the two sectors.

3. The method of claim 2, wherein if there is a first sector in the first area using a first carrier, and the access terminal is in the first sector using the first carrier, and there is the neighboring second area in which no sector uses the first carrier, then causing the access terminal to alter communication comprises:

instructing the access terminal to disconnect from the radio node and to connect to a second radio node using the second information transmitted for a second sector.

4. A method, comprising:

receiving information about signals detected by an access terminal, a first signal of the signals being generated by a radio node with which the access terminal is in communication, the radio node and the access terminal being in a radio access network, the radio access network comprising sectors;

if a second signal of the signals detected by the access terminal does not correspond to a signal between the radio node and the access terminal, and if a condition is met, causing the access terminal to alter communication with the radio node;

transmitting second information for each of the sectors, in which selection of the second information is based on criteria that are not the same in each of the sectors, wherein the second information for each of the sectors comprises an identification of one or more sectors in a neighboring area that uses a same carrier as one or more of the sectors, and wherein if a first sector in a first area uses a first carrier, and a second sector in a neighboring second area uses a second carrier, and there is no sector in the neighboring second area using the first carrier, then the second information for the first sector comprises an identification of the second sector.

5. The method of claim 4, wherein if there is the first sector in the first area using the first carrier, and the access terminal is in the first sector, and there is the neighboring second area in which no sector uses the first carrier, then causing the access terminal to alter communication comprises:

instructing the access terminal to disconnect from the radio node and to connect to a second radio node using the second information transmitted for the first sector.

6. The method of claim 1, wherein the quality of the second signal comprises a power of the second signal.

7. The method of claim 6, further comprising:

increasing a rate at which the message is repeatedly transmitted if the power of the second signal increases.

8. The method of claim 6, further comprising:

increasing a rate at which the message is repeatedly transmitted if the power of the second signal is above a threshold.

9. The method of claim 1, further comprising:

increasing a rate at which the message is repeatedly transmitted if the access terminal is in a sector that uses a carrier that is not used by a neighboring sector.

10. The method of claim 1, wherein the second information for each of the sectors comprises a first list and a second list, the first list for each of the sectors comprising an identification of a carrier used in at least one of the sectors, and the second list for each of the sectors comprising an identification of one or more sectors in a neighboring area that uses a same carrier as one or more of the sectors:

wherein if two sectors are co-located in a first area, a first list for one of the two sectors comprises an identification of a carrier used by another of the two sectors unless there is a neighboring second area in which no sector uses the carrier used by the other of the two sectors, and wherein if a first sector in the first area uses a first carrier, and a second sector in the neighboring second area uses a second carrier, and there is no sector in the neighboring second area using the first carrier, then the second list for the first sector comprises an identification of the second sector.

11. A method performed by at least one of a radio network controller or a radio node, the method comprising:

receiving information about signals detected by an access terminal, a first signal of the signals being generated by a radio node with which the access terminal is in communication, the radio node and the access terminal being in a radio access network, the radio access network comprising sectors;

if a second signal of the signals detected by the access terminal does not correspond to a signal between the radio node and the access terminal, and if a condition is met, causing the access terminal to alter communication with the radio node;

evaluating the condition by comparing a power of the second signal to a threshold;

transmitting lists of second information for each of the sectors, wherein selection of the second information is based on criteria that are not same in each of the sectors; and repeatedly transmitting a message to the access terminal, wherein at least some of the information about the signals detected by the access terminal are received in response to the message, and wherein the condition comprises that the second signal has a power greater than a threshold.

12. The method of claim 1, wherein the second information for each of the sectors comprises a list, the list for each of the sectors comprising an identification of a carrier used in at least one of the sectors, and wherein if two sectors are co-located in a first area, the list for each one of the two sectors comprises an identification of a carrier used by another of the two sectors unless there is a neighboring second area in which no sector uses the carrier used by the other of the two sectors.

13. The method of claim 1, wherein the second information for each of the sectors comprises a list, the list for each of the sectors comprising an identification of one or more sectors in a neighboring area that uses the same carrier as one or more of the sectors, and wherein if a first sector in a first area uses a first carrier, and a second sector in a neighboring second area uses a second carrier, and there is no sector in the neighboring second area using the first carrier, then the list for the first sector comprises an identification of the second sector.

* * * * *

UNITED STATES PATENT AND TRADEMARK OFFICE
CERTIFICATE OF CORRECTION

PATENT NO. : 8,094,630 B2
APPLICATION NO. : 11/303773
DATED : January 10, 2012
INVENTOR(S) : Deepak Garg Page 1 of 1

It is certified that error appears in the above-identified patent and that said Letters Patent is hereby corrected as shown below:

Title Page, Column 2 (Abstract), Line 6, Delete "devise" and insert -- device --, therefor.

Signed and Sealed this
First Day of May, 2012

David J. Kappos
*Director of the United States Patent and Trademark Office*